US006857957B2

(12) United States Patent
Marks et al.

(10) Patent No.: US 6,857,957 B2
(45) Date of Patent: Feb. 22, 2005

(54) POKER GAME WITH 2 REWARD CARDS THAT ADJUST PAYTABLE

(76) Inventors: Daniel Marks, 150 Airport Executive Park, Suite 152, Nanuet, NY (US) 10954; Anthony Singer, 150 Airport Executive Park, Suite 152, Nanuet, NY (US) 10954; Howard Marks, 150 Airport Executive Park, Suite 152, Nanuet, NY (US) 10954

( * ) Notice: Subject to any disclaimer, the term of this patent is extended or adjusted under 35 U.S.C. 154(b) by 372 days.

(21) Appl. No.: 10/142,131

(22) Filed: May 7, 2002

(65) Prior Publication Data

US 2003/0040352 A1 Feb. 27, 2003

Related U.S. Application Data

(60) Provisional application No. 60/289,633, filed on May 9, 2001.

(51) Int. Cl.[7] .................................................. A63F 13/00

(52) U.S. Cl. .......................................... 463/13; 273/292

(58) Field of Search ............................... 463/11–13, 22, 463/25, 21; 273/274, 292, 309

(56) References Cited

U.S. PATENT DOCUMENTS 5,042,818 A * 8/1991 Weingardt ................... 463/13
5,255,915 A * 10/1993 Miller ......................... 463/13
5,332,219 A * 7/1994 Marnell et al. ............... 463/13
6,068,552 A * 5/2000 Walker et al. ................ 463/21
6,520,856 B1 * 2/2003 Walker et al. ................ 463/21
6,569,013 B1 * 5/2003 Taylor ......................... 463/13
6,663,487 B1 * 12/2003 Ladner ........................ 463/13

* cited by examiner

*Primary Examiner*—John M. Hotaling, II
(74) *Attorney, Agent, or Firm*—John Edward Roethel

(57) ABSTRACT

A video poker game that uses additional cards to enhance the value of some or all winning card combinations ("Reward Cards"). In the preferred embodiment of the present invention, two Reward Cards are added the traditional fifty-two card deck of playing cards. These Reward Cards do not help form any winning poker hands, but only enhance the value of some or all of the winning poker hands formed using the traditional fifty-two cards in the deck. A single Reward Card would double the payouts; two Reward Cards would quadruple the payouts. As a result, a preferred embodiment offers awards up to four times the traditional awards; maintains the full values of the underlying pay table; minimally impacts traditional poker strategy; and results in an overall return to the player of 99.2948% using a preferred pay table.

9 Claims, 8 Drawing Sheets

POKER GAME WITH 2 REWARD CARDS THAT ADJUST PAYTABLE

CROSS-REFERENCE TO RELATED APPLICATION

This application is related to and claims the benefit of U.S. Provisional Application Ser. No. 60/289,633, filed May 9, 2001, entitled "Method of Playing a Gaming Machine and Supplemental Payoffs".

FIELD OF TECHNOLOGY

This invention relates primarily to electronic video gaming devices, and more particularly to electronic video poker games that use additional cards to enhance the value of some or all winning card combinations ("Reward Cards").

BACKGROUND OF THE INVENTION

In a conventional poker machine, one or more five card poker games are offered to the player. To play a game, the player deposits money in the form of coins, gaming tokens or paper currency either into a coin head or bill acceptor ("the coin-in"). The coins and gaming tokens are collected in a reservoir inside the gaming machine ("the hopper") while the paper currency is collected in the bill acceptor inside the gaming machine. If the coins, gaming tokens or paper currency are validated as authentic, the player accrues the appropriate number of playing units ("credits") on a credit meter on the gaming machine depending on the denomination of the wager as set on the gaming machine. For example, a 25-cent gaming machine will accrue four credits for each dollar deposited into the gaming machine by way of the coin head or the bill acceptor.

After accruing credits on the credit meter, the player determines how many credits he wishes to wager ("total bet") and then deals the cards by pressing the Deal button. In a Draw Poker game, the machine deals five cards face-up ("deal") from a deck of fifty-two cards ("deck"); the player makes a decision as to which cards to hold and which cards to discard ("discard"); discarded cards are replaced with new cards from the remaining cards in the deck ("draw"); and the game determines the value based on poker hand rankings of the resulting five cards ("the final hand"). In a Stud Poker game, there is just a deal and final hand, with no discard or draw. In other poker games, there may be other methods of play, such as limitations on the number of discards (i.e. three or fewer cards), two or more draws (i.e. double-draw), and/or more or less than five card in the poker hand (i.e. three card poker).

The player collects credits for various types of card combinations in the final hand, according to a predetermined schedule ("pay table"). The number of credits indicated by the pay table multiplies the total wager ("pay out"). For example: a player wagers 10 credits on a deal; achieves a final hand worth 6 credits; and receives a 60-credit pay out, or 10-credit total wager times 6-credit award indicated by the pay table.

Following any pay out, the credits won are added to the player's balance of credits shown in the credit meter. As long as the player has credits on the credit meter, the player may continue to play the gaming machine or the player may collect the remaining balance of credits by pressing a Cash Out button the gaming machine. In addition, the player may view the rules of the game by pressing the Help button before any deal.

Thus, a conventional poker machine only issues awards for specific card combinations, according to a fixed pay table. As a result of this limitation:

- Poker games utilize static pay tables. A single, simple change in a pay table may impact traditional poker strategy and, therefore, force the player to learn a new, and possibly complex, poker strategy. In addition, many players desire traditional pay tables (i.e. bonus poker and double-bonus poker) and do not play games with unfamiliar pay tables.
- Poker games do not utilize bonus features. A single simple bonus feature may reduce the traditional pay table and cause a strategy change and/or create an unfamiliar pay table.

It is an object of the present invention to address these limitations and create a poker game that enhances the traditional pay table, utilizes bonus features and does not impact traditional poker strategy.

SUMMARY OF THE INVENTION

The present invention includes a variety of methods of play that can be programmed on an electronic video poker machine. Each electronic video poker machine is programmed to use additional cards to enhance the value of some or all winning card combinations ("Reward Cards").

In a preferred embodiment of the present invention, two Reward Cards are added to the traditional deck of fifty-two cards. The Reward Cards do not act as regular playing cards (i.e. no suit or rank); each card is marked with the words "Reward Card." A game of five card Double Bonus video poker with Reward Cards is played as follows:

- On the deal, the player is randomly dealt five cards face-up from the deck;
- On the discard, the player decides which cards to discard and which cards to hold;
- Reward Cards cannot be held and, therefore, must be discarded;
- All discarded cards, including any Reward Cards that have been discarded, are permanently removed from the deck;
- On the draw, the player is dealt cards from the same deck to replace the discarded cards;
- On the final hand, the player is issued an award based on the traditional Double Bonus payout table, plus an enhanced award for 1 or 2 Reward Cards dealt or drawn, as follows:

If the Player Wagers One Credit

| Hand Type | 0 RCs | 1 RCs | 2 RCs |
|---|---|---|---|
| Royal Flush | 250 | 500 | 1000 |
| Straight Flush | 50 | 100 | 200 |
| 4 of a Kind (Aces) | 160 | 320 | 640 |
| 4 of a Kind (2, 3, 4) | 80 | 160 | 320 |
| 4 of a Kind (5–K) | 50 | 100 | 200 |
| Full House | 9 | 18 | 36 |
| Flush | 6 | 12 | 24 |
| Straight | 4 | 8 | 16 |
| 3 of a Kind | 3 | 6 | 12 |
| Two Pair | 1 | 2 | 4 |
| High Pair (Jacks+) | 1 | 1 | 2 |

If The Player Wagers Two, Three or Four Credits, then the Amount of the Payout is Multiplied by the Number of Credits Wagered If the Player Wagers Five Credits (the Typical Maximum Wager on a Video Poker Machine), the Player Receives Enhanced Payouts for a Royal Flush

| Hand Type | 0 RCs | 1 RCs | 2 RCs |
|---|---|---|---|
| Royal Flush | 4000 | 8000 | 16000 |

Any suitable pay table can be used based on the overall game return desired by the casino operator. The above example is a preferred embodiment of the present invention.

Reward Cards do not help form any winning poker hands, but only enhance the value of some or all of the winning poker hands formed using the traditional 52-cards in the deck.

Note that Reward Cards can be acquired in any of the following five ways:

1 Reward Card on the deal, 0 Reward Cards on the draw;

2 Reward Cards on the deal, 0 Reward Cards on the draw;

0 Reward Cards on the deal, 1 Reward Card on the draw;

0 Reward Cards on the deal, 2 Reward Cards on the draw; and

1 Reward Card on the deal, 1 Reward Card on the draw.

The preferred embodiment of the present invention, therefore, offers awards up to four times the traditional awards; maintains the traditional Double Bonus pay table; minimally impacts traditional poker strategy; and results in an overall return to the player of 99.2948%.

Alternatively, the present invention allows for many other embodiments, including but not limited to the following:

Any type of poker game. The present invention allows for Rewards Cards in any type of poker game. For example: 3-card draw, 5-card draw, 3-card stud, 5-card stud, 7-card stud, and/or other forms and combinations of poker games including multi-hand poker games.

Any type of poker pay table. The present invention allows for Rewards Cards to enhance the values of some or all winning card combinations of any pay table. For example: Draw Poker, Bonus Poker, Double Bonus Poker, Double-Double Bonus Poker, and/or other types and combinations of pay tables.

Any timing of Reward Cards. The present invention allows for any timing of the Reward Cards. For example: only during the deal, only during the draw, during the deal or during the draw, during the first draw but not any subsequent draw, any other predetermined time, a time determined by a third party, and/or at random times.

Any location of Reward Cards. The present invention allows for Reward Cards to appear in any position in the poker hand. For example, Reward cards may only appear in card positions 1, 3, and 5 in a five card poker hand. Alternatively, Reward Cards may only enhance the pay table if they appear in specific positions in the poker hand. For example, Reward Cards may appear anywhere, but only enhance awards if they appear in positions 1, 3, and 5 of the five card poker hand.

Any number of Reward Cards. The present invention allows for one or more Reward Cards to be added to the deck. In addition, the number of Reward Cards may change during the play of the game. For example: more Reward Cards may be available during the deal than during the draw (or vice versa); a special event determines, adds and/or subtracts a number of Reward Cards; a third party determines, adds or subtracts a number of Reward Cards; and/or Reward Cards are randomly determined, added or subtracted from the deck.

Any effect of Reward Cards. The present invention allows for Reward Cards to have any affect on the value of some or all of the poker hands. For example: multiply, add, subtract, divide, square, and/or other method of enhancing or changing the value of some or all poker hands. In addition, Reward Cards may award free games, extra cards, additional draws, wild cards, credits, and/or rewards independent of poker hands, such as, products and services.

Any interaction of Reward Cards. The present invention allows for multiple Reward Cards to interact with one another in any manner. For example: a Reward Card may multiply the value of previous Reward Cards (3× Reward Card followed by 2× Reward Card results in 6× enhancement of pay table); a Reward Card may add to the value of previous Reward Cards (3× Reward Card followed by 2× Reward Card results in 5× enhancement of pay table); a Reward Card may subtract from the value of previous Reward Cards (3× Reward Card followed by 2× Reward Card results in 1× enhancement of pay table); a Reward Card may divide the value of previous Reward Cards (3× Reward Card followed by 2× Reward Card results in 1.5× enhancement of pay table); a Reward Card may square the value of previous Reward Cards (3× Reward Card followed by 2× Reward Card results in 9× enhancement of pay table); and/or interact in any other method. In addition, the method of play may require two or more Reward Cards to trigger any award, such as, two Reward Cards would be required to trigger 2× enhancement of pay table.

All of these alternative embodiments rely upon the underlying Reward Cards concept that uses additional cards to enhance the value of some or all winning card combinations ("Reward Cards").

There has thus been outlined, rather broadly, the more important features of the invention in order that the detailed description thereof that follows may be better understood, and in order that the present contribution to the art may be better appreciated. There are, of course, additional features of the invention that will be described hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION OF THE PREFERRED EMBODIMENTS

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

"Double-Bonus Poker" with Two Reward Cards

A preferred embodiment of present invention illustrates the play of: five card, single draw poker game using a Double Bonus Poker pay table ("Double Bonus-Poker") with two Rewards Cards.

Figure 1:
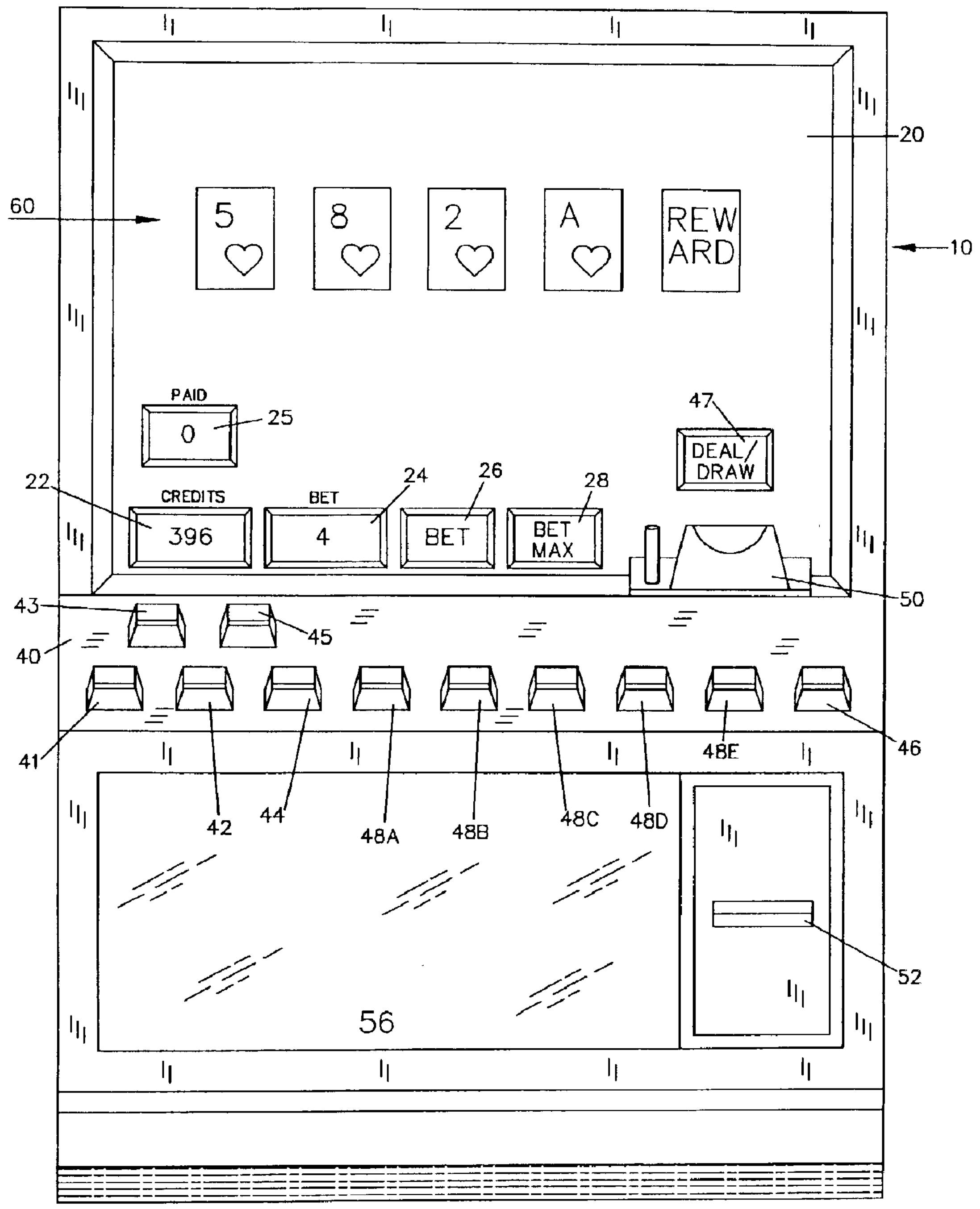
FIG. 1 shows a gaming machine that can be used to practice the method of the present invention and shows the initial deal of a representative first hand.

FIG. 1 shows generally at 10 a typical electronic video gaming machine that is configured to provide to the player the method of the present invention. The electronic video gaming machine 10 includes a conventional coin head 50 into which the player can insert coins or gaming tokens and a slot 52 which leads to a conventional bill acceptor mounted on the interior of the gaming machine and into which the player can insert paper currency. The use of coins, tokens or paper currency is the mechanism by which the player wagers on the poker hands the player wishes to play. As is also conventional in electronic video gaming machines, a credit meter display 22 is provided to show the amount of credits that the player has accrued on the gaming machine 10—either by inserting coins, tokens or paper currency or from winning plays achieved by the player. Whenever the player makes a wager, the amount of the wager is decremented from the credit meter display 22. Whenever the player achieves a winning play during the play of the game, the amount of the winning play is incremented on the credit meter display 22.

A conventional payout hopper is also located on the interior of the gaming machine and is used to dispense coins or tokens to the player into a payout tray 56 when the player wishes to collect any winning amounts the player has accrued. Other suitable and conventional payout mechanisms can be used, such as a ticket printer or other cashless payout devices.

The gaming machine 10 also includes a video screen display 20 of any suitable type upon which representations of playing cards are displayed. In a preferred embodiment of the present invention, one or more hands can be displayed on the video screen display 20 at the same time. As shown in FIG. 1, a first hand: HAND ONE 60 is shown. Each hand would preferably have five card locations preferably from left to right in a horizontal row, although other manners of displaying multiple hands can be used. The video screen display 20 also contains a location at which the amount wagered on each hand is shown, for example, "Bet" 24.

A button panel 40 is also provided on the gaming machine 10 and the buttons mounted on the button panel 40 are used by the player to control the operation of the gaming machine 10. Any suitable configuration of the buttons on the button panel can be used and, alternatively, conventional touch screen technology can be used for any or all of the buttons mounted on the button panel.

A typical button arrangement is shown on the button panel 40 in FIG. 1. A "BET ONE" button 42 is provided to allow the player to wager one credit at a time. A "BET MAX" button 44 is provided to allow the player to wager the maximum amount of credits permitted by the configuration of the gaming machine 10. Any number of credits can be set as the maximum amount that it is possible to wager on each hand and, typically, five credits will be the maximum number of credits for any particular hand. Alternatively, a BET ONE location 26 and a BET MAX location 28 can be provided on the video screen 20 to allow the player to wager by using conventional touch screen technology.

A conventional "DEAL/DRAW" button 46 is also provided on the button panel 40 which is used by the player to activate the initial deal of the cards at the deal stage of the method of play or the dealing of replacement cards at the draw stage of the method of play as is appropriate. Similarly, a DEAL/DRAW location 47 can be provided on the video screen 20 to allow the player to effect either the deal step or the draw step by using conventional touch screen technology.

The button panel 40 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location.

The method of play of the various versions of the present invention will now be described. After the player has inserted an appropriate amount of coins, tokens or paper currency to add a sufficient amount of credits on the credit display meter 22, the player makes his initial wager. The player may press the BET ONE button 42 one or more times to bet in single increments or the player may merely press the "BET MAX" button 44 and the maximum number of credits are applied, for example, five credits would be wagered. The player can also use the touch screen locations to make his wager as described above.

To play the poker game, the player establishes a pool of credits, sets the wager, deals the cards, chooses which cards to hold and discard, draws replacement cards, and collects credits for winning card combinations, with enhancements for any Reward Cards dealt and/or drawn.

Buttons

In the preferred embodiment of the present invention, a set of buttons are mounted on the button panel and are used by the player to control the functions of the poker game: Bet One 42, Bet Max 44, Deal/Draw 46, Help 43, Pay Table 45, and Cash Out 41. Any or all of these control buttons may be displayed on the video display and/or buttons hard wired to the gaming device. If necessary, any number of buttons may be added to further facilitate control of the game, such as Hold buttons to "hold" the cards shown on the video display displayed.

Meters

In the preferred embodiment of the present invention, meters are shown on the video display screen to display the salient information for the game: Credits meter 22, Bet meter 24, and Paid meter 25. The Credits meter 22 displays the total number credits remaining in the credit pool; the Bet meter 24 displays the amount wagered on the current, previous, and/or upcoming poker hand and is associated with the Bet One 42 and Bet Max 44 buttons; and the Paid meter 25 displays the amount of credits won on the current or previous poker hand.

Credit Pool

In a preferred embodiment of the present invention, the player deposits coins, tokens, paper currency, credit cards, debit cards, or other forms of physical and/or electronic currency into the coin head slot 50 or a paper currency bill acceptor 52 to establish a pool of credits. The amount of this common pool of credits is displayed to the player on the Credits meter 22. The pool of credits increases and decreases according to the player's wins or losses and may be supplemented, if necessary, by the player by additional deposits of coins, tokens, paper currency, credit cards, debit cards, or other forms of physical and/or electronic currency.

Set the Wager

In a preferred embodiment of the present invention, the player sets the value of the wager by using the Bet One 42 and Bet Max 44 buttons. The bet may range between one credit and N-credits, with N equal to a predetermined maximum or set by the current value of the Credit Pool. The typical video poker gaming machine uses a five credit maximum wager.

Deck of Cards

In a preferred embodiment of the present invention, each card dealt is selected from a set of fifty-four cards comprised of: a fifty-two card traditional deck (i.e. the traditional four suits of Spades, Hearts, Diamonds, Clubs, with thirteen ranks in each suit of 2, 3, 4, 5, 6, 7, 8, 9, 10, Jack, Queen, King and Ace); and two Reward Cards.

Deal of Cards

In a preferred embodiment of the present invention, the player causes the machine to deal the cards by pressing the Deal button 46. Once the Deal button 46 is pressed, the wager is final and non-refundable. For each deal, the machine randomly displays five cards face-up in the five card positions. A displayed card is removed from the deck and may not be dealt again during the game; only the remaining non-dealt cards in the deck may be used to replace a dealt card.

Hold and Discard

In a preferred embodiment of the present invention, the player selects which cards to hold and which cards to discard using the buttons on the machine or touching the cards on the video display (i.e. pressing a button or touching a card will "hold" the card) Alternatively, the machine may automatically select cards to hold and/or discard and then allow the player to override the selections by using the buttons or touching the screen.

Winning Card Combinations

In a preferred embodiment of the present invention, the player is paid for predetermined winning combinations of cards that appear in the final hand. Each winning combination pays the amount indicated on the game's pay table times the total amount wagered on that hand. Furthermore, the value of a winning card combination may be enhanced by the appearance of one or more Reward Cards during the deal or draw; all enhanced values are also reflected on the game's pay table.

Base Game Example

Sam Slotsky is standing in front of a nickel-denomination version of the preferred embodiment of the present invention. Sam sees five, adjacent, empty card positions on the video display.

Sam presses the Pay Table button 45 to view the pays for winning card combinations, plus enhanced pays for Reward Cards (RCs):

If the Player Wagers One Credit

| Hand Type | 0 RCs | 1 RCs | 2 RCs |
|---|---|---|---|
| Royal Flush | 250 | 500 | 1000 |
| Straight Flush | 50 | 100 | 200 |
| 4 of a Kind (Aces) | 160 | 320 | 640 |
| 4 of a Kind (2, 3, 4) | 80 | 160 | 320 |
| 4 of a Kind (5–K) | 50 | 100 | 200 |
| Full House | 9 | 18 | 36 |
| Flush | 6 | 12 | 24 |
| Straight | 4 | 8 | 16 |
| 3 of a Kind | 3 | 6 | 12 |
| Two Pair | 1 | 2 | 4 |
| High Pair (Jacks+) | 1 | 1 | 2 |

If the Player Wagers Two, Three or Four Credits, then the Amount of the Payout is Multiplied by the Number of Credits Wagered If the Player Wagers Five Credits (the Typical Maximum Wager on a Video Poker Machine), the Player Receives Enhanced Payouts for a Royal Flush

| Hand Type | 0 RCs | 1 RCs | 2 RCs |
|---|---|---|---|
| Royal Flush | 4000 | 8000 | 16000 |

Sam then presses the Help button 43 to view the rules of the poker game. After reading the game rules for the game, he returns to the base game screen.

Sam deposits $20 into the bill acceptor slot 52 and the Credits meter counts up from 0 to 400 as shown in FIG. 1 since the denomination for this game is five cents per credit. Sam then his sets the wager:

The game's Bet meter 0. Sam presses the Bet One button four times and the Bet meter 24 counts up from 0 to 4;

The Paid meter reads 0.

After setting his wagers, Sam presses the Deal 46 button. The Credits meter 22 counts down from 400 to 396. The machine deals five cards face-up into the five card positions. For example: using S(pades), H(earts), D(iamonds), C(lubs), to represent the four suits; numbers 2 to 10, J(ack), Q(ueen), K(ing), A(ce) to represent the ranks within each suit set; and "Reward Card" to represent the Reward Cards; the machine displays the following cards as shown in FIG. 1:

| | | | | |
|---|---|---|---|---|
| 5H | 8H | 2H | AH | Reward Card |

Figure 2:
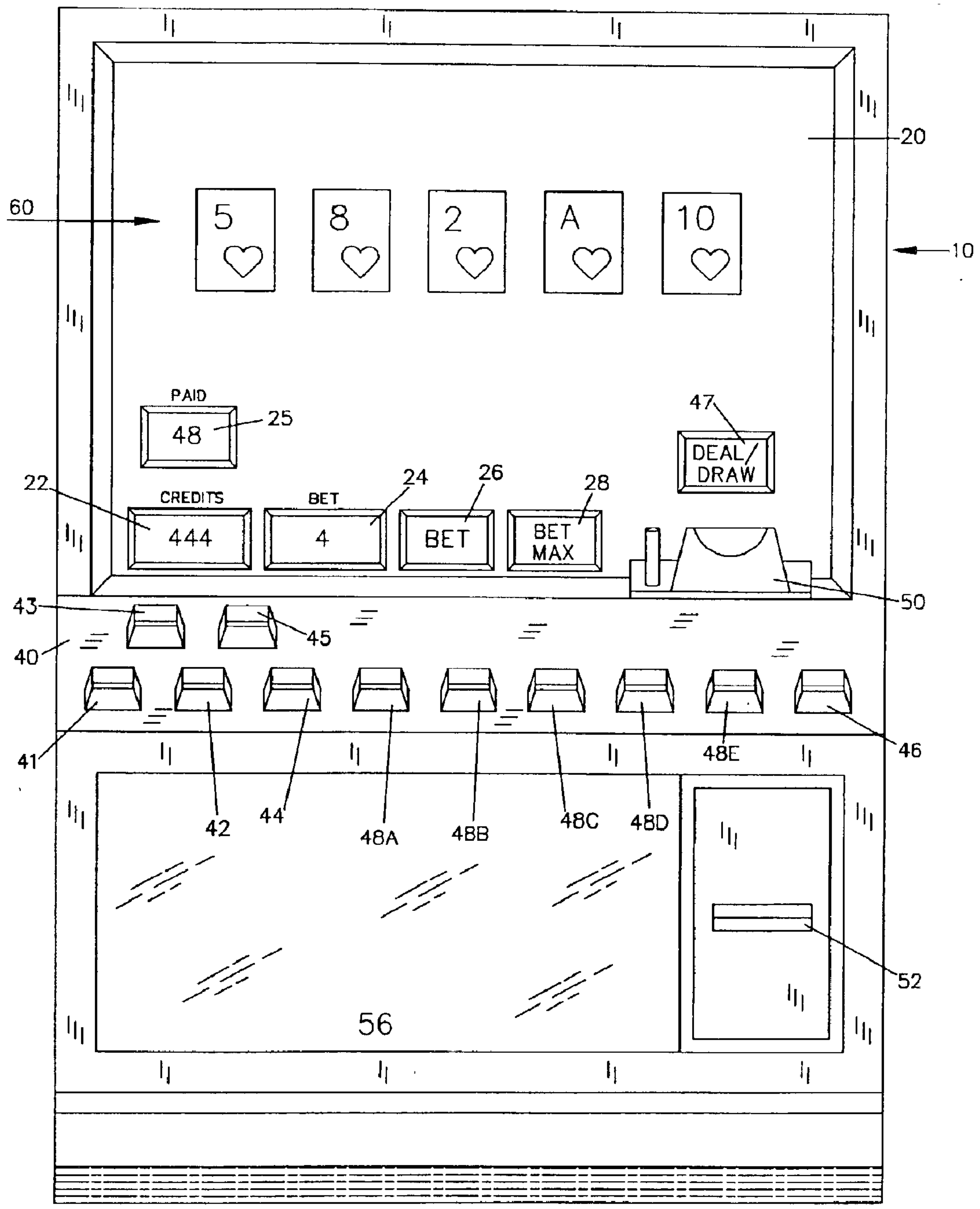
FIG. 2 shows the first hand after the draw step has occurred.

Using the Hold buttons below each of the five card positions, the player Holds the 5H, 8H, 2H, and AH, and replaces the Reward Card. The machine deals the 10H to create the following final hand as shown in FIG. 2:

| | | | | |
|---|---|---|---|---|
| 5H | 8H | 2H | AH | 10H |

The game awards Sam forty-eight credits for a winning card combination of five same suited cards, or a Flush. The award reflects the game pay table that states that a Flush with one Reward Card pays twelve credits for each credit wagered on the hand. The Credits meter 22 counts up from 396 to 444 and the game Paid meter 25 reads 48.

Figure 3:
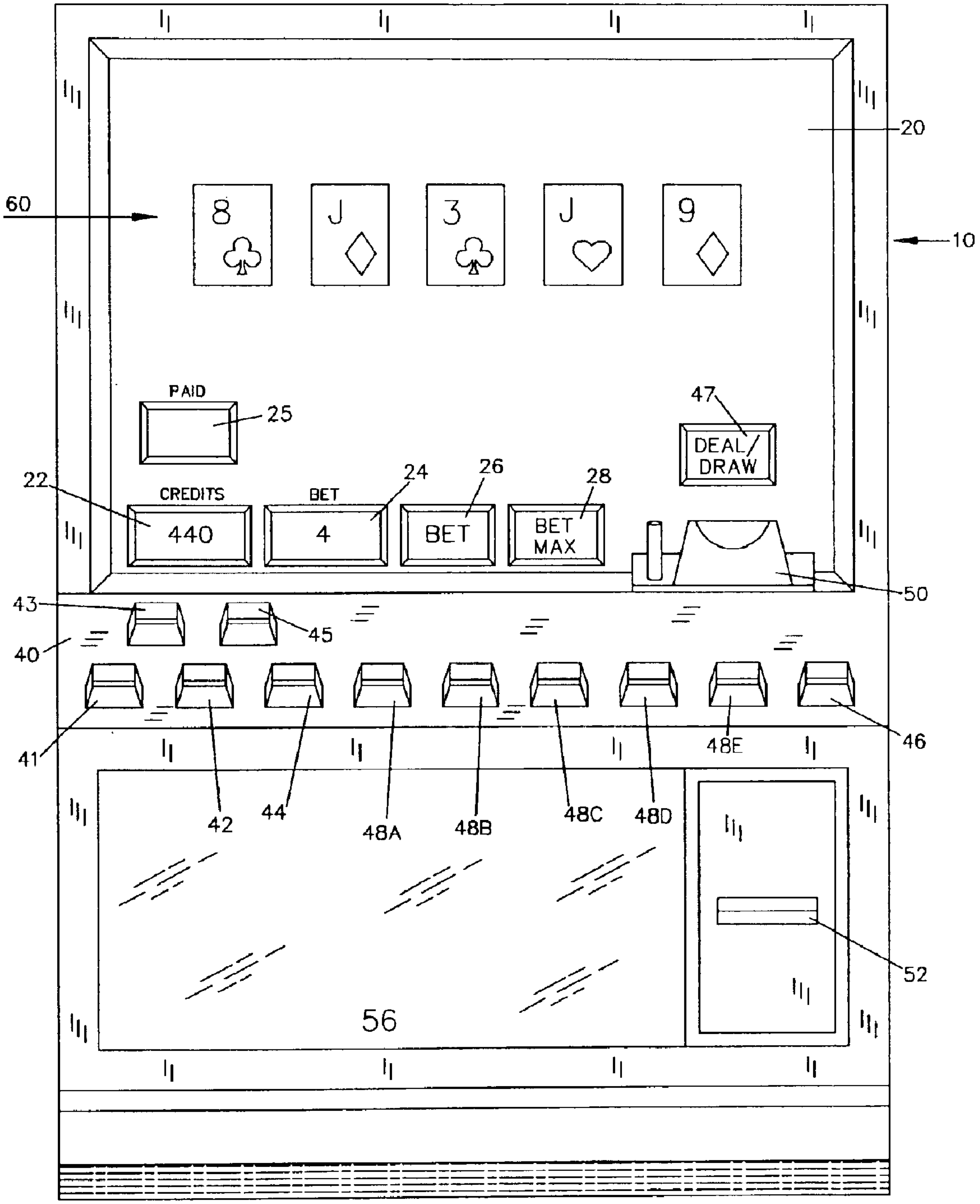
FIG. 3 shows a representative second hand after the initial deal has occurred.

Desiring a new game, Sam presses the Deal button 46. The Credits 22 meter counts down from 444 to 440. The machine uses a "fresh" 54-card deck to deal five new cards face-up into the five card positions. For example: using S(pades), H(earts), D(iamonds), C(lubs), to represent the four suits; numbers 2 to 10, J(ack), Q(ueen), K(ing), A(ce) to represent the ranks within each suit set; and "Reward Card" to represent the Reward Cards; the machine displays the following cards as shown in FIG. 3:

| | | | | |
|---|---|---|---|---|
| 8C | JD | 3C | JH | 9D |

Figure 4:
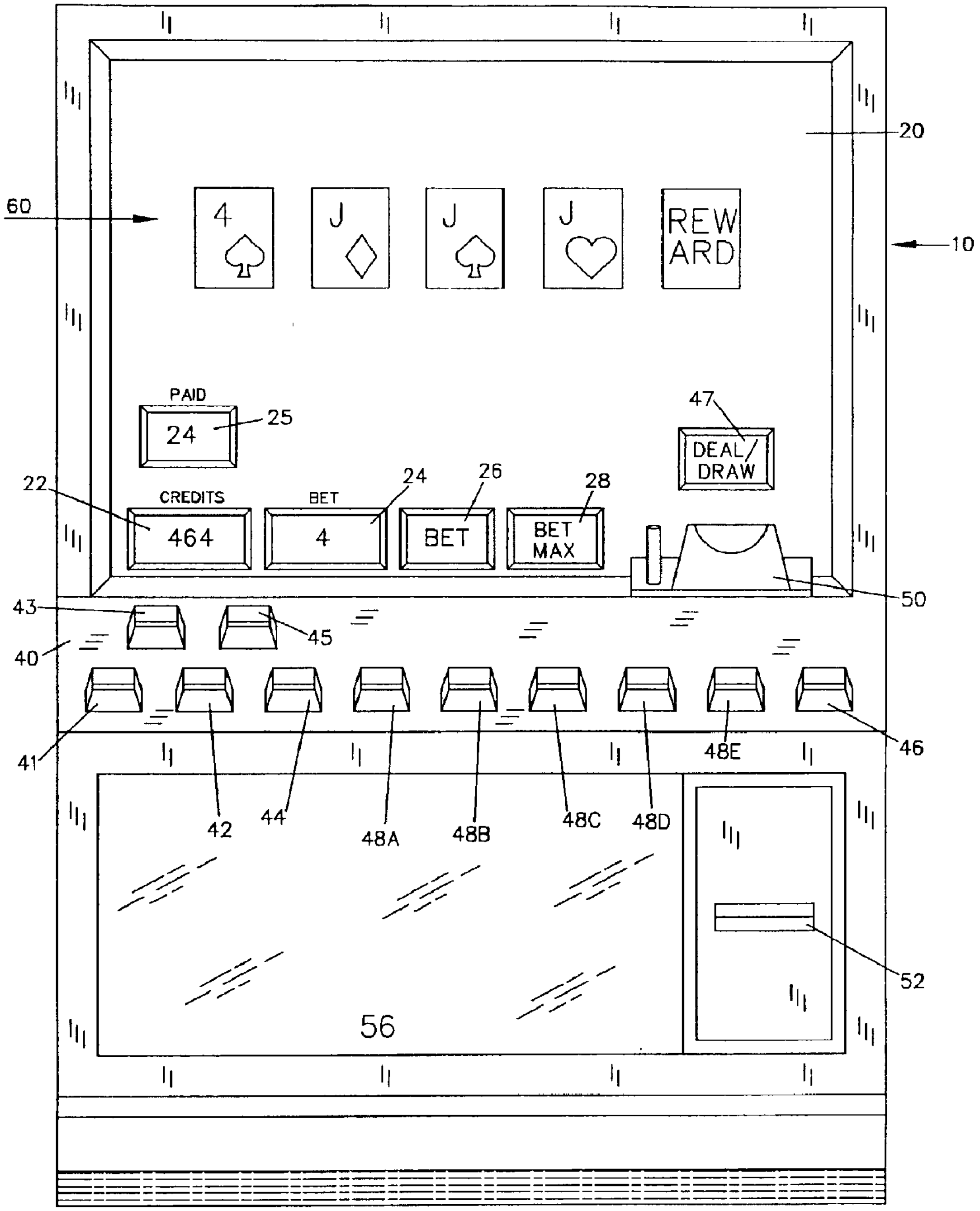
FIG. 4 shows the second hand after the draw step has occurred.

Using the Hold buttons below each of the five card positions, the player Holds the JD and JH, and replaces the 8C, 3C, and 9D. The machine deals the 4S, JS, and Reward Card to create the following final hand as shown in FIG. 4:

| | | | | |
|---|---|---|---|---|
| 4S | JD | JS | JH | Reward Card |

The game awards Sam twenty-four credits for a winning card combination of three same ranked cards, or Three-of-a-Kind. The award reflects the game pay table that states that Three-of-a-kind with one Reward Card pays six credits for each credit wagered on the hand. The Credits meter 22 counts up from 440 to 464 and the game Paid meter 25 reads 24.

Figure 5:
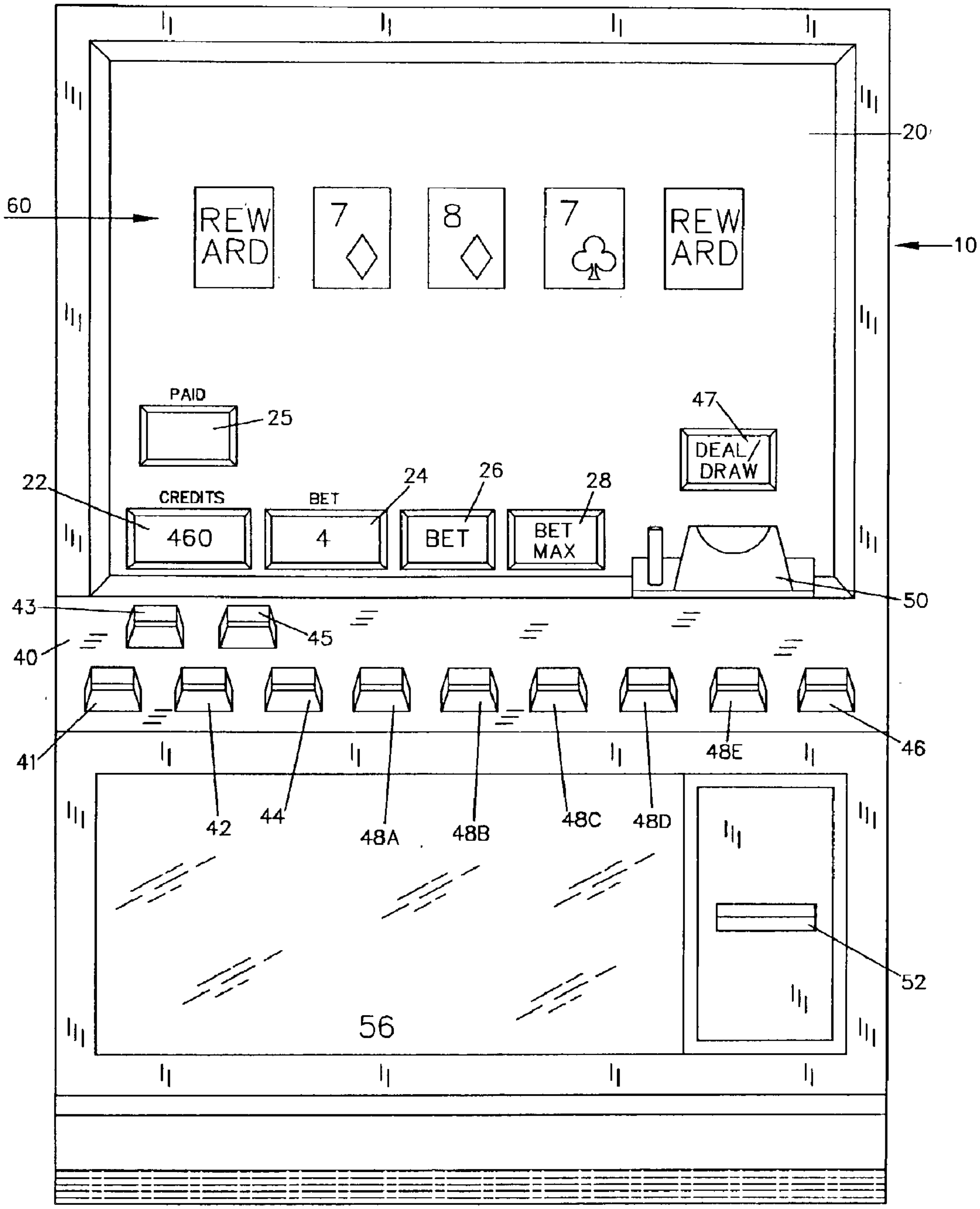
FIG. 5 shows a representative third hand after the initial deal has occurred.

Again, desiring a new game, Sam presses the Deal button 46. The Credits meter 22 counts down from 464 to 460. The machine uses a "fresh" 54-card deck to deal five new cards face-up into the five card positions. For example: using S(pades), H(earts), D(iamonds), C(lubs), to represent the four suits; numbers 2 to 10, J(ack), Q(ueen), K(ing), A(ce) to represent the ranks within each suit set; and "Reward Card" to represent the Reward Cards; the machine displays the following cards as shown in FIG. 5:

| | | | | |
|---|---|---|---|---|
| Reward Card | 7D | 8D | 7C | Reward Card |

Figure 6:
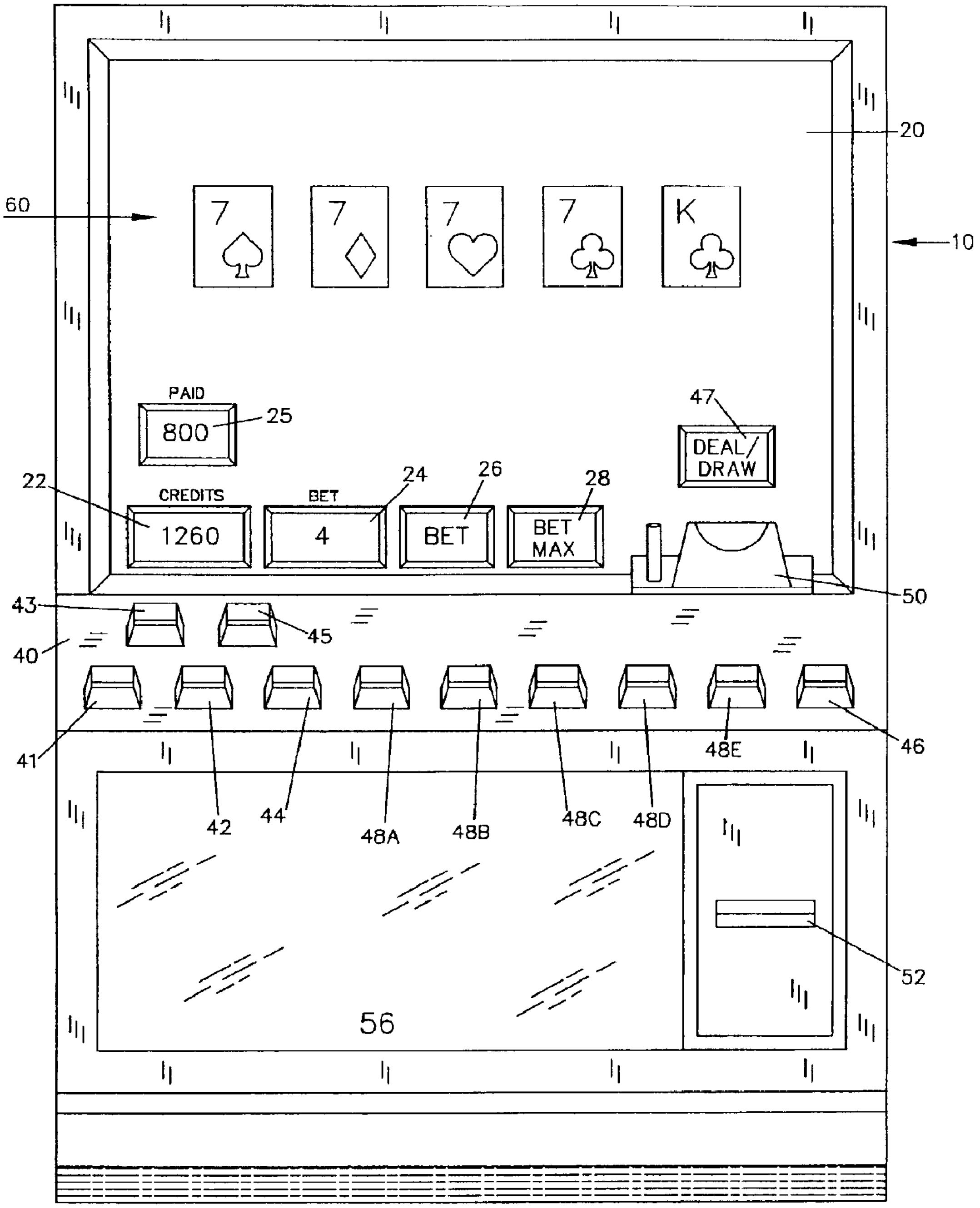
FIG. 6 shows the third hand after the draw step has occurred.

Using the Hold buttons below each of the five card positions, the player Holds the 7D and 7C, and replaces the 8D and the two Reward Cards. The machine deals the 7S, 7H, and KC to create the following final hand as shown in FIG. 6:

| | | | | |
|---|---|---|---|---|
| 7S | 7D | 7H | 7C | KC |

The game awards Sam 800 credits for a winning card combination of four same ranked cards, or Four-of-a-Kind. The award reflects the game pay table that states that Four-of-a-kind with two Reward Card pays 200 credits for each credit wagered on the hand. The Credits meter 22 counts up from 460 to 1,260 and the game Paid 25 meter reads 800.

Figure 7:
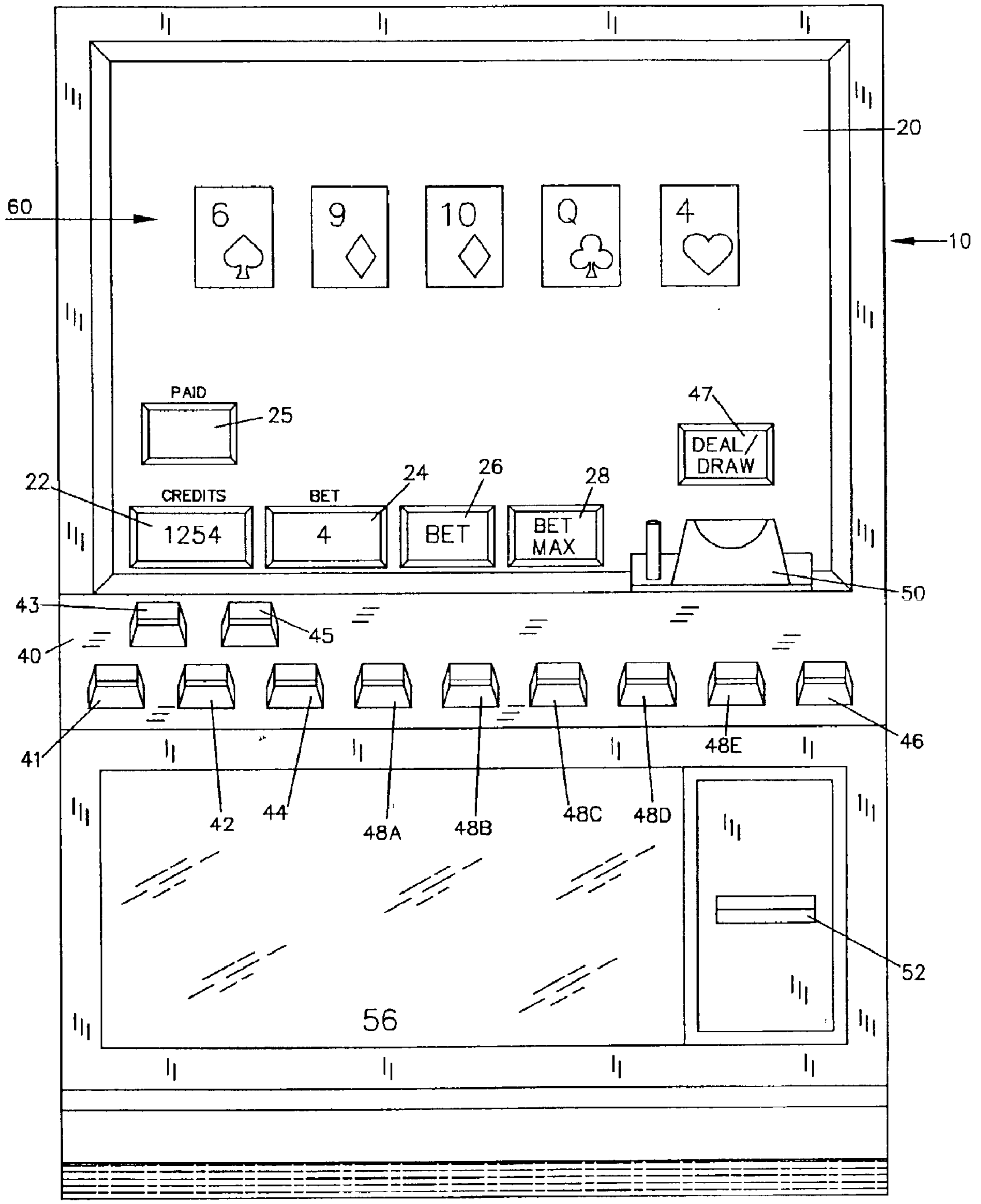
FIG. 7 shows a representative fourth hand after the initial deal has occurred.

Once again, desiring a new game, Sam presses the Deal button. The Credits meter 22 counts down from 1,260 to 1,256. The machine uses a "fresh" 54-card deck to deal five new cards face-up into the five card positions. For example: using S(pades), H(earts), D(iamonds), C(lubs), to represent the four suits; numbers 2 to 10, J(ack), Q(ueen), K(ing), A(ce) to represent the ranks within each suit set; and "Reward Card" to represent the Reward Cards; the machine displays the following cards as shown in FIG. 7:

| | | | | |
|---|---|---|---|---|
| 6S | 9D | 10D | QC | 4H |

Figure 8:
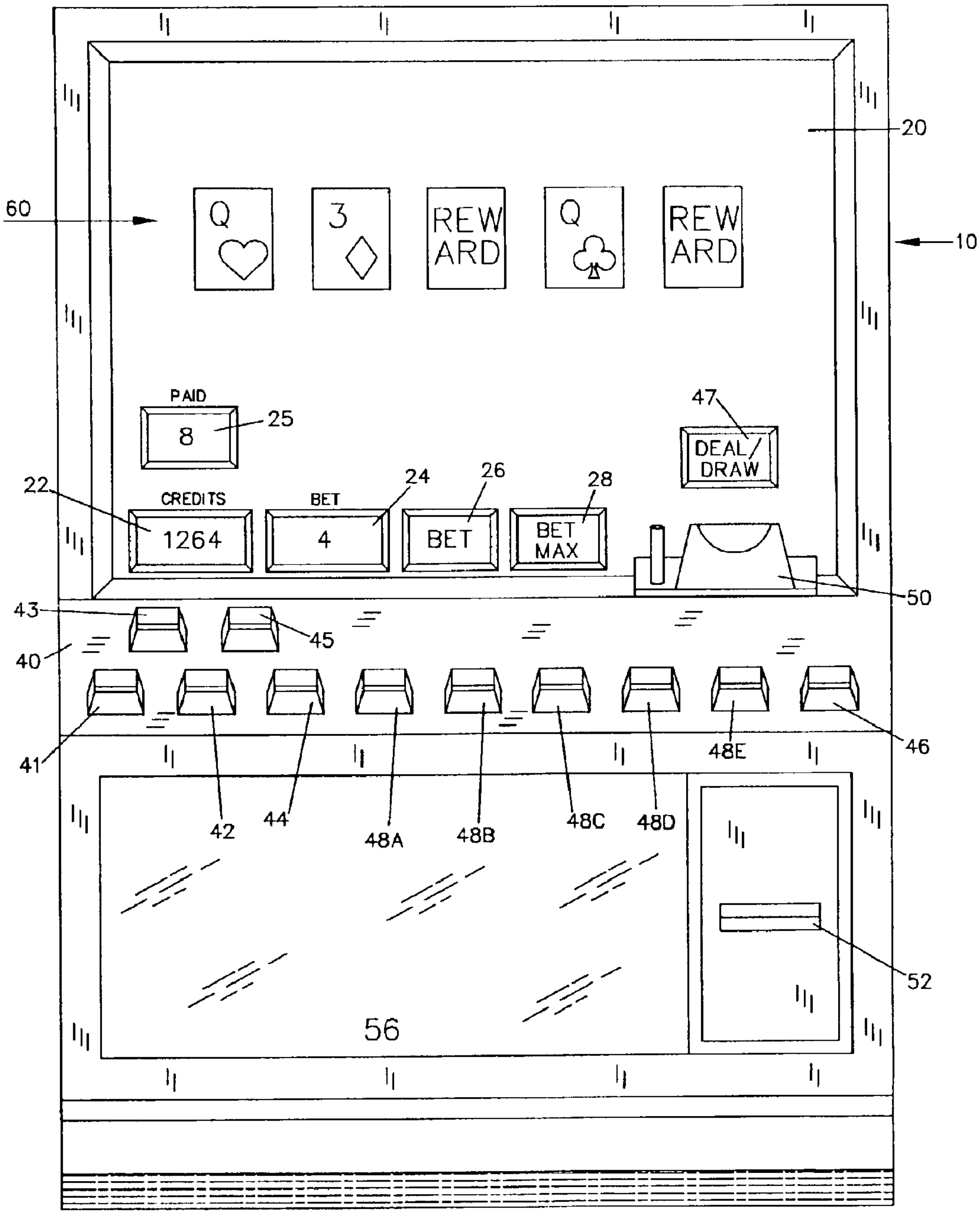
FIG. 8 shows the fourth hand after the draw step has occurred.

Using the Hold buttons below each of the five card positions, the player Holds the QC, and replaces the 6S, 9D, 10D and 4H. The machine deals the QH, 3D, Reward Card and Reward Card to create the following final hand as shown in FIG. 8:

| | | | | |
|---|---|---|---|---|
| QH | 3D | Reward Card | QC | Reward Card |

The game awards Sam 8 credits for a winning card combination of two same ranked cards (of a rank of J, Q, K or A), or a High Pair (Jacks or Better). The award reflects the game pay table that states that High Pair with two Reward Card pays two credits for each credit wagered on the hand. The Credits meter 22 counts up from 1,256 to 1,264 and the game Paid meter 25 reads 8.

Content with his winnings, Sam presses the Cash Out button 41. The gaming device issues 1,264 nickels or any other form of currency, including cash, an EZ-PAY™ ticket, or electronic payment transfer card/device.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

What is claimed is:

1. A method of playing a card game in which a player makes a wager to participate in the card game comprising:

a) providing a modified deck of playing cards having a standard fifty-two card deck and at least two Reward Cards;

b) providing an initial pay table in which payouts are based on poker hand rankings and the amount of the wager;

c) if the player receives one Reward Card during the play of the game, changing the payouts in the pay table by a first amount; and if the player receives two Reward Cards during the play of the game, changing the payouts in the pay table by a second amount;

d) shuffling the modified deck of cards and displaying a starting hand of cards to the player;

e) selecting none, one or more of the cards as cards to be held;

f) discarding the cards that were not selected to be held and replacing each of those cards with another card to make a final hand;

g) determining the poker hand ranking of the final hand; and h) paying the player a preestablished amount from the pay table based on the amount of the wager if the resulting cards of the final hand comprise a predetermined poker hand ranking.

2. The method of claim 1 in which the first amount is double the initial pay table.

3. The method of claim 1 in which the second amount is quadruple the initial pay table.

4. An apparatus for playing a card game in which a player makes a wager to participate in the card game comprising:

a) means for providing a modified deck of playing cards having a standard fifty-two card deck and at least two Reward Cards;

b) means for providing an initial pay table in which payouts are based on poker hand rankings and the amount of the wager;

c) if the player receives one Reward Card during the play of the game, means for changing the payouts in the pay table by a first amount; and if the player receives two Reward Cards during the play of the game, means for changing the payouts in the pay table by a second amount;

d) means for shuffling the modified deck of cards and means for displaying a starting hand of cards to the player;

e) means for selecting none, one or more of the cards as cards to be held;

f) means for discarding the cards that were not selected to be held and replacing each of those cards with another card to make a final hand;

g) means for determining the poker hand ranking of the final hand; and h) means for paying the player a preestablished amount from the pay table based on the amount of the wager if the resulting cards of the final hand comprise a predetermined poker hand ranking.

5. The apparatus of claim 4 in which the first amount is double the initial pay table.

6. The apparatus of claim 4 in which the second amount is quadruple the initial pay table.

7. A video poker machine configured to allow a player to play a card game in which a player makes a wager to participate in the card game comprising:

a) providing a modified deck of playing cards having a standard fifty-two card deck and at least two Reward Cards;

b) providing an initial pay table in which payouts are based on poker hand rankings and the amount of the wager;

c) if the player receives one Reward Card during the play of the game, changing the payouts in the pay table by a first amount; and if the player receives two Reward Cards during the play of the game, changing the payouts in the pay table by a second amount;

d) shuffling the modified deck of cards and displaying a starting hand of cards to the player;

e) selecting none, one or more of the cards as cards to be held;

f) discarding the cards that were not selected to be held and replacing each of those cards with another card to make a final hand;

g) determining the poker hand ranking of the final hand; and h) paying the player a preestablished amount from the pay table based on the amount of the wager if the resulting cards of the final hand comprise a predetermined poker hand ranking.

8. The video poker machine of claim 7 in which the first amount is double the initial pay table.

9. The video poker machine of claim 7 in which the second amount is quadruple the initial pay table.

* * * * *